United States Patent
Kim et al.

(10) Patent No.: US 10,669,428 B2
(45) Date of Patent: Jun. 2, 2020

(54) MANUFACTURING METHOD FOR POROUS THERMAL INSULATION COATING LAYER, POROUS THERMAL INSULATION COATING LAYER AND INTERNAL COMBUSTION ENGINE USING THE SAME

(71) Applicant: Hyundai Motor Company, Seoul (KR)

(72) Inventors: Bokyung Kim, Gyeonggi-do (KR); In Woong Lyo, Gyeonggi-do (KR); Woong Pyo Hong, Gyeonggi-Do (KR); Hong Kil Baek, Seoul (KR); Su Jung Noh, Seoul (KR); Seung Jeong Oh, Gyeonggi-do (KR); Seung Woo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 232 days.

(21) Appl. No.: 15/333,682

(22) Filed: Oct. 25, 2016

(65) Prior Publication Data
US 2018/0016442 A1    Jan. 18, 2018

(30) Foreign Application Priority Data
Jul. 12, 2016   (KR) ........................ 10-2016-0088156

(51) Int. Cl.
*C09D 5/00* (2006.01)
*C09D 1/00* (2006.01)
(Continued)

(52) U.S. Cl.
CPC ................. *C09D 5/00* (2013.01); *C09D 1/00* (2013.01); *C23C 18/1216* (2013.01); *C23C 18/1254* (2013.01); *C23C 18/1295* (2013.01); *F02B 67/06* (2013.01); *F02B 77/11* (2013.01); *Y02T 50/6765* (2018.05)

(58) Field of Classification Search
CPC .......... C09D 5/00; C09D 1/00; C23C 18/1216
See application file for complete search history.

(56) References Cited

U.S. PATENT DOCUMENTS

| 6,620,458 B2 | 9/2003 | Poco et al. |
| 2004/0170849 A1 | 9/2004 | Ackerman et al. |

(Continued)

FOREIGN PATENT DOCUMENTS

| CN | 1865136 A | 11/2006 |
| CN | 101072727 A | 11/2007 |

(Continued)

OTHER PUBLICATIONS

Wang, Wenqin, et al., "Trimethylethoxysilane-modified super heat-resistant alumina aerogels for high-temperature thermal insulation and adsorption applications", RSC Adv., 4 (2014) 54864-54871.

(Continued)

*Primary Examiner* — Victor S Chang
(74) *Attorney, Agent, or Firm* — Mintz Levin Cohn Ferris Glovsky and Popeo, P.C.; Peter F. Corless

(57) ABSTRACT

Disclosed are a manufacturing method for a porous thermal insulation coating layer, a porous thermal insulation coating layer with substantially reduced thermal conductivity and volumetric heat capacity and an internal combustion engine including the porous thermal insulation coating layer thereby having excellent durability.

9 Claims, 3 Drawing Sheets

(51) Int. Cl.
F02B 77/11 (2006.01)
F02B 67/06 (2006.01)
C23C 18/12 (2006.01)

(56) References Cited

U.S. PATENT DOCUMENTS

2007/0238008 A1* 10/2007 Hogan .................... B60R 13/08
219/458.1
2010/0155644 A1* 6/2010 Ou ........................ C01B 33/155
252/62
2015/0184588 A1* 7/2015 Seo ...................... C09D 183/00
428/220

FOREIGN PATENT DOCUMENTS

| CN | 101210146 A | 7/2008 |
| CN | 101749926 A | 6/2010 |
| CN | 102317209 A | 1/2012 |
| JP | 2001-139321 A | 5/2001 |
| KR | 2009-0023207 A | 3/2009 |
| KR | 10-2009-0042673 A | 4/2009 |
| KR | 2009-0053348 A | 5/2009 |
| KR | 10-2016-0037813 A | 4/2016 |
| WO | 2006/024010 A2 | 3/2006 |

OTHER PUBLICATIONS

Rao, A. Parvathy et al., "Effect of preparation conditions on the physical and hydrophobic properties of two step processed ambient pressure dried silica aerogels", Jrl. of Materials Science, 40 (2005) 3481-3489.

* cited by examiner

MANUFACTURING METHOD FOR POROUS THERMAL INSULATION COATING LAYER, POROUS THERMAL INSULATION COATING LAYER AND INTERNAL COMBUSTION ENGINE USING THE SAME

CROSS-REFERENCE TO RELATED APPLICATION

This application claims the benefit of priority to Korean Patent Application No. 10-2016-0088156 filed in the Korean Intellectual Property Office on Jul. 12, 2016, the entire contents of which are incorporated herein by reference.

TECHNICAL FIELD

The present invention relates to a porous thermal insulation coating layer, a method for manufacturing the porous thermal insulation coating layer, and an internal combustion engine using the porous thermal insulation coating layer. The porous thermal insulation coating layer of the present invention may have reduced thermal conductivity and volumetric heat capacity such that as being applied to an internal combustion engine, the coating layer may have substantially improved durability.

BACKGROUND OF THE INVENTION

An internal combustion engine refers to an engine in which combustion gas itself generated by combustion of fuels directly functions on a piston, a turbine blade, or the like, to convert thermal energy of the fuel into a mechanical work. The internal combustion engine is generally referred to as a reciprocating type engine in which gas mixture of fuel and air is ignited and exploded in a cylinder to move the piston. However, a gas turbine, a jet engine, a rocket, and the like, also correspond to the internal combustion engines.

The internal combustion engine may be classified into a gas engine, a gasoline engine, a petroleum engine, a diesel engine, and the like, according to used fuels. For instance, the petroleum engine, gas engine and the gasoline engine are ignited by an electrical arc by spark plug, and the diesel engine is naturally ignited by spraying the fuel in high temperature and high pressure air. In addition, the internal combustion engine may also include four-stroke and two-stroke cycle types according to stroke operation of the piston.

It has been generally known that the internal combustion engine of the vehicle has thermal efficiency of about 15% to 35%, and even in maximum efficiency of the internal combustion engine, about 60% or greater of the entire thermal energy may be consumed by thermal energy discharged to the outside through wall of the internal combustion engine, exhaust gas, and the like.

Accordingly, when reducing an amount of the thermal energy discharged to the outside through the wall of the internal combustion engine, efficiency of the internal combustion engine may be increased, such that methods of installing thermal insulation materials on the outside of the internal combustion engine, changing materials or portions of a structure of the internal combustion engine, or developing cooling systems of the internal combustion engine have been used.

In particular, when minimizing the discharge of heat generated in the internal combustion engine through the wall of the internal combustion engine to the outside, efficiency of the internal combustion engine and fuel efficiency of a vehicle may be improved. However, research into thermal insulation materials, thermal insulation structures, and the like, which can be maintained in the internal combustion engine under repeated high temperature and high pressure conditions for a long time has not been accomplished significant improvement.

Therefore, development of a novel thermal insulation material having substantially low thermal conductivity and thermal resistance, and being applied to an internal combustion engine to be maintained for a long period of time has been demanded.

SUMMARY OF THE INVENTION

In preferred aspects, the present invention provides a porous thermal insulation coating layer having substantially reduced thermal conductivity and volumetric heat capacity and a method of manufacturing thereof, such that the porous thermal insulation coating layer suitably may be applied to an internal combustion engine to have excellent durability.

In one aspect, the present invention may provide a porous thermal insulation coating layer manufactured from the manufacturing method for a porous thermal insulation coating layer.

Further, the present invention may provide an internal combustion engine using the porous thermal insulation coating layer.

In an exemplary embodiment of the present invention, provided is a method of manufacturing a porous thermal insulation coating layer. The method may include: coating a reaction product obtainable, obtained or produced from a reaction of metal alkoxide containing at least one metal selected from the group consisting of aluminum, zirconia, titanium and silicon with alcohol, and water, drying the coated reaction product at a first temperature; and performing a thermal treatment at a second temperature that is greater than the first temperature and less than about 300° C.

The second temperature suitably may range from about 20° C. to about 220° C. and be greater than the first temperature.

The performing of the thermal treatment at the second temperature suitably may be conducted for about 12 hours to 48 hours.

Alternatively, the first temperature may range from about 30° C. to about 100° C.

The second temperature suitably may range from about 100° C. to about 250° C.

The reaction product may be produced or obtained by reacting of the metal alkoxide containing at least one selected from the group consisting of aluminum, zirconia, titanium and silicon with alcohol and water, and an amount of about 10 to 100 parts by weight of alcohol relative to 100 parts by weight of the metal alkoxide of the metal may be reacted. In addition, an amount of about 110 to 500 parts by weight of water relative to 100 parts by weight of the metal alkoxide of the metal may be reacted.

The method may further include: before the drying of the coated reaction product at the first temperature, adding a solution including a silane-based compound to the product of the coating step.

The silane-based compound may comprise a silane compound substituted with at least one functional group selected from the group consisting of a C1-C10 alkyl group and a C1-C10 alkoxy group.

The coated reaction product may be dried at the first temperature of about 30° C. to 100° C. for about 10 minutes to 500 minutes.

In another embodiment of the present invention, provided is a porous thermal insulation coating layer that may include: an aerogel including at least one metal selected from the group consisting of aluminum, zirconia, titanium and silicon.

Preferably, the aerogel may comprise pores having a diameter of about 1 nm to 500 nm.

The term "porous" as used herein refers to containing pores such as a porous material. Typical porous materials will have a plurality of pores, for example, which may be formed regularly or irregularly on a surface and/or inside the material.

In addition, the term "pore" as used herein refers to a vacancy, hole or cavity formed inside a material or matrix. Size or the shape of the pore may not be particularly limited. Preferably, the pores included in the aerogel may be defined with an average diameter without particular shape of the pores. For example, the aerogel may comprise nanopores having a diameter of about 5 nm to about 100 nm.

The term "thermal insulation" as used herein refers to a property of material to reduce heat transfer or thermal energy dissipation between materials or toward exterior of the material. The thermal insulation may be indicated with a thermal conductivity of material, for example, less thermal conductivity indicates greater thermal insulation property of the material. Exemplary thermal insulation layer of the present invention may have a thermal conductivity less than a predetermined range, for example, 1.80 W/mK or less according to ASTM E1461.

The aerogel may further comprise a silane-based functional group bonded to a surface.

The silane-based functional group suitably may comprise a silyl functional group substituted with at least one functional group selected from the group consisting of a C1-C10 alkyl group and a C1-C10 alkoxy group.

Preferably, a porosity of the porous thermal insulation coating layer may be about 10% or greater.

Preferably, a volumetric heat capacity of the porous thermal insulation coating layer, as measured according to ASTM E1269, may be about 2000 KJ/m$^3$K or less.

Preferably, a thermal conductivity of the porous thermal insulation coating layer, as measured according to ASTM E1461, may be about 1.80 W/mK or less.

Preferably, a bonding force to a metal substrate, as measured on the basis of ISO 20502 standard, may be about 5N or greater, and the metal included in the aerogel may be bonded to the metal substrate through a polyfunctional group comprising at least one central element selected from the group consisting of carbon, silicon, nitrogen, oxygen, phosphorus and sulfur.

Further provided is an internal combustion engine including the porous thermal insulation coating layer as described herein. In particular, the internal combustion engine may comprise the porous thermal insulation coating layer on an inner surface or a surface of the internal combustion engine.

Preferably, the porous thermal insulation coating layer may be bonded with and the inner surface of the internal combustion engine or the surface of the internal combustion engine, through a polyfunctional group that comprises at least one element selected from the group consisting of carbon, silicon, nitrogen, oxygen, phosphorus and sulfur.

Still further provided is a vehicle that may comprise the porous thermal insulation coating layer as described herein.

Other aspects of the present invention are disclosed infra.

DETAILED DESCRIPTION OF THE INVENTION

Figure 1:
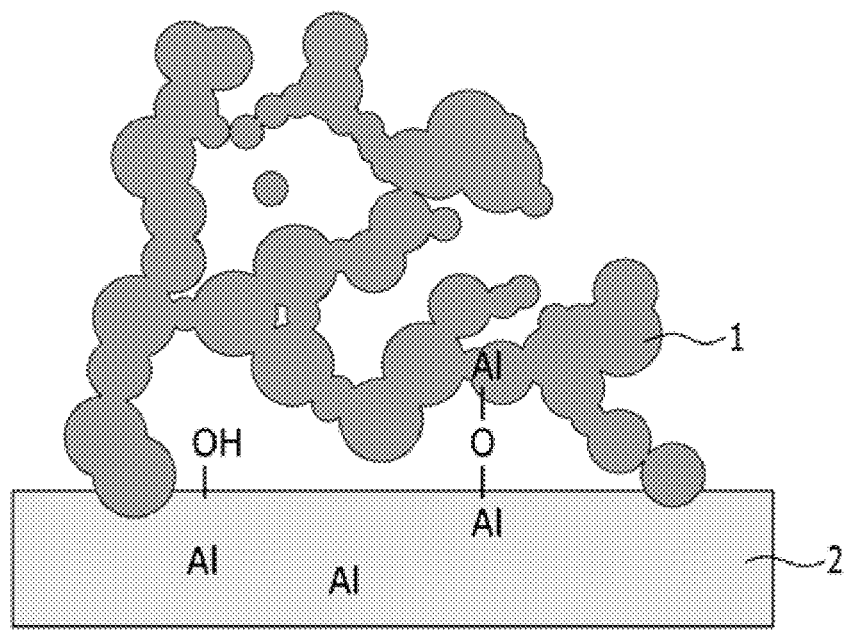
FIG. 1 illustrates an exemplary porous thermal insulation coating layer formed on a substrate according to an exemplary embodiment of the present invention.
Figure 2:
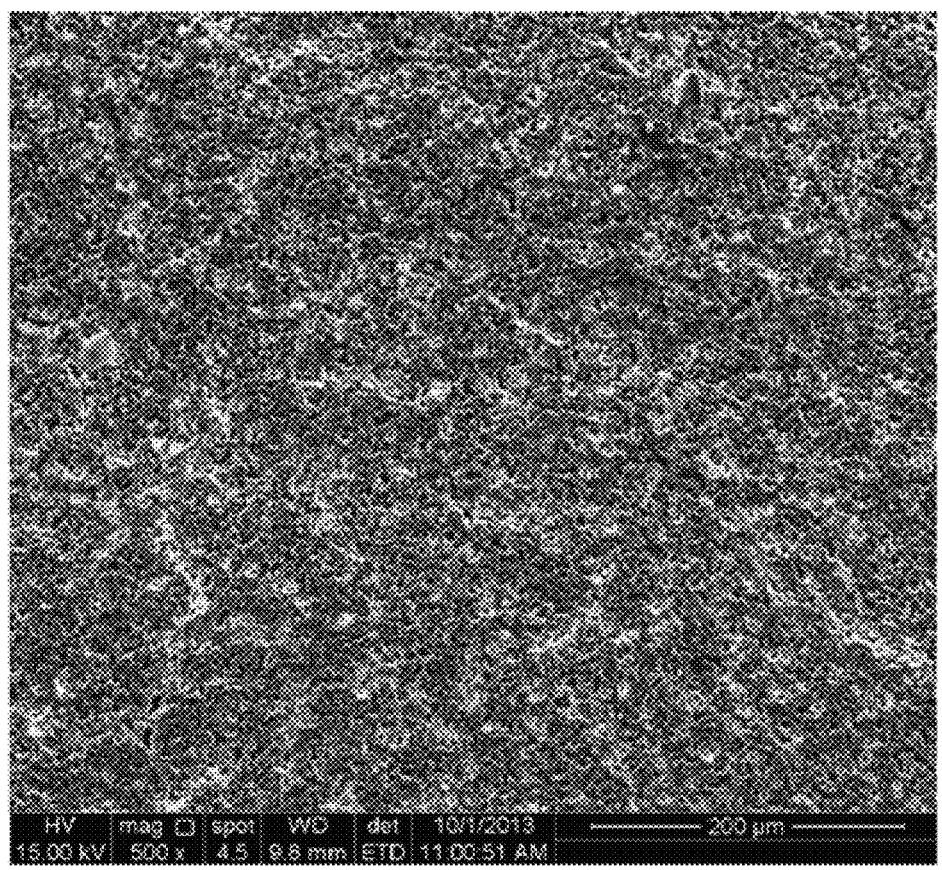
FIG. 2 shows a scanning electron microscopy (SEM) image of an exemplary porous thermal insulation coating layer manufactured by Example 1 according to an exemplary embodiment of the present invention.
Figure 3:
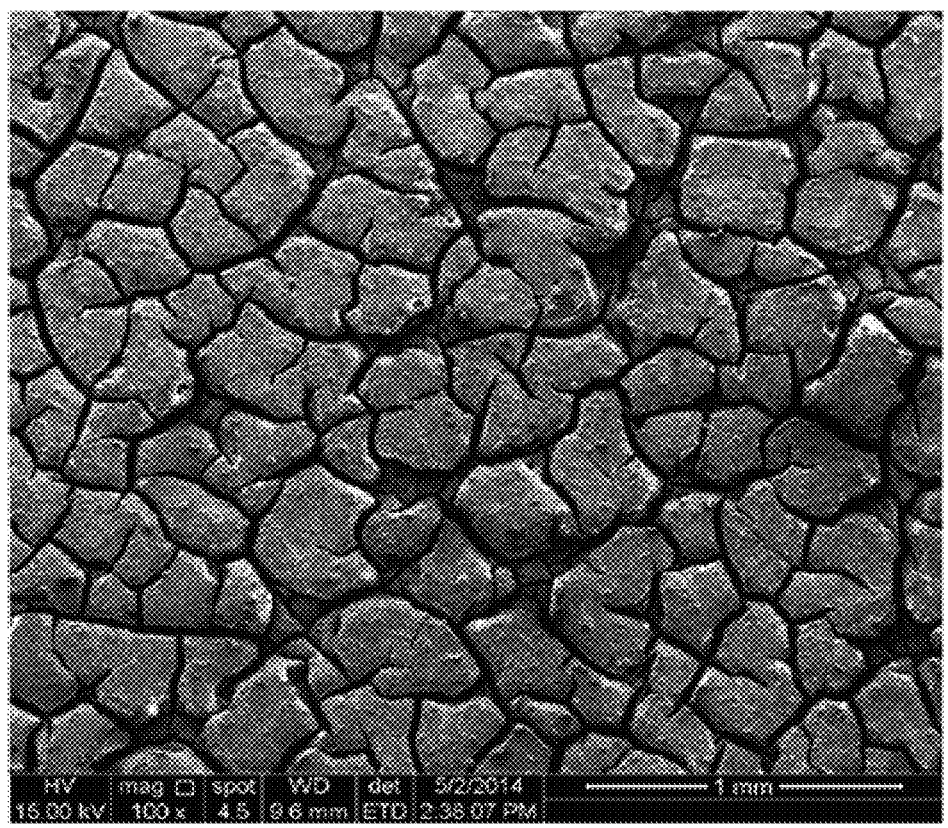
FIG. 3 shows a SEM image of a porous thermal insulation coating layer manufactured by Comparative Example 1 as the related arts.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a method for manufacturing a porous thermal insulation coating layer, a porous thermal insulation coating layer, and an internal combustion engine using the same according to various exemplary embodiments of the present invention are described in more detail.

According to an exemplary embodiment of the present invention, a manufacturing method for an exemplary porous thermal insulation coating layer may include: coating a reaction product obtainable, obtained or produced from a reaction of metal alkoxide containing at least one metal selected from the group consisting of aluminum, zirconia, titanium and silicon with alcohol and water; drying the coated reaction product at a first temperature; and performing a thermal treatment at a second temperature greater than the first temperature and less than about 300° C.

The present inventors have found through experiments that at the time of using the manufacturing method for a porous thermal insulation coating layer as described above. For example, various metal compounds (e.g. metal alkoxide) could be used to manufacture an aerogel having high porosity, and a solvent in the aerogel could be removed and dried by a multiple thermal treatments (for example, first and second thermal treatments) of the manufactured aerogel. In addition, when a covalent bond of the metal substrate and the aerogel was made, a bonding force of the porous thermal insulation coating layer could be improved to increase durability.

In a conventional method for mixing the aerogel and a binder resin and subsequent coating, when an internal combustion engine and the like was produced by that method, a coating layer may have a crack and be delaminated due to a high internal temperature, such that durability may be significantly deteriorated.

On the contrary, according to the present invention, it was confirmed that the aerogel having a porous structure may be directly formed on a surface of the metal substrate, and through a thermal treatment at a predetermined temperature range, the covalent bond of the aerogel and the metal substrate may be introduced thereby implementing excellent durability. Further, a silicon-based aerogel may be applied together with aerogels including various metal materials.

Preferably, the method may include coating a reaction product obtained from a reaction which may be performed with metal alkoxide containing at least one metal selected from the group consisting of aluminum, zirconia, titanium and silicon, alcohol, and water. The coated reaction product may be dried at a first temperature according to an exemplary embodiment of the present invention.

The metal alkoxide refers to a compound obtained by substituting a hydrogen atom of hydroxy group (—OH) of alcohol with a metal atom, and the metal suitably may include at least one selected from the group consisting of aluminum, zirconia, titanium and silicon. Preferably, aluminum may be used as the metal.

Examples of the alcohol are not significantly limited, but may include various alcohol compounds such as methanol, ethanol, propanol, and the like, without limitation. Alcohol used herein may be used as a reaction material that may directly participate in a reaction or may be a solvent for increasing reactivity.

In addition, water as used herein may be a reactant that may directly participate in a reaction or be a solvent for increasing reactivity.

The reaction product may be produced or obtained by reacting the metal alkoxide as described above, alcohol, and water. Exemplary form of the reaction product are not significantly limited, but may have a form in which particles in a sol form are dispersed in the solvent such as alcohol and water.

Subsequently, in the drying at the first temperature, the particles in a sol form may be agglomerated and have a gel form, and all solvents such as alcohol, water and the like may be reduced to form pores in the gel.

Preferably, the reaction product obtained from a reaction of metal alkoxide containing at least one metal selected from the group consisting of aluminum, zirconia, titanium and silicon with alcohol and water may be coated, which may be followed by drying at the first temperature. The first temperature suitably may range from about 30° C. to about 100° C., or from about 50° C. to about 90° C., or particularly from about 70° C. to about 90° C.

The reaction of the metal alkoxide with alcohol and water may be conducted at a temperature of about 0° C. to 60° C. under an acidic catalyst. An example of the acidic catalyst may include hydrochloric acid, which may not be particularly limited.

Examples of the reaction of the metal alkoxide with alcohol and water may not be particularly limited, but for example, may include a hydrolysis reaction and a polymerization reaction performed by mixing the metal alkoxide, alcohol and water, and leaving or slowly stirring the mixture at a temperature of about 0° C. to 60° C. for about 10 minutes to 24 hours, thereby, thereby performing hydrolysis and a polymerization reaction. The particles may be formed in a sol form by the hydrolysis reaction and the polymerization reaction.

In the reacting of the metal alkoxide with alcohol and water, an amount of about 10 to 100 parts by weight of alcohol relative to 100 parts by weight of the metal alkoxide may be reacted. In addition, in the reacting of the metal alkoxide with alcohol and water, an amount of about 110 to 500 parts by weight of water relative to 100 parts by weight of the metal alkoxide of the metal may be reacted.

In the coating of the product of the reacting step, examples of specific coating method are not significantly limited, but may include various coating methods known in a coating field without limitation. Targets for coating may be various substrates. The substrate refers to a material to be coated by the porous thermal insulation coating layer, and examples thereof are not significantly limited, but for example, may include a metal substrate, an inner surface of the internal combustion engine or a component of the internal combustion engine, and the like.

Further, the manufacturing method for a porous thermal insulation coating layer may further include: before the drying of the product of the coating step at the first temperature of 30° C. to 100° C., adding a solution including a silane-based compound to the product of the coating step.

Accordingly, a silane-based functional group derived from the silane-based compound may be bonded to a surface of the product of the coating step. The solution including the silane-based compound may further include alcohol as a solvent together with the silane-based compound, and the alcohol may not be significantly limited in view of kinds, but for example, may include isopropyl alcohol (IPA).

Further, the manufacturing method may further include, before the adding of the solution including the silane-based compound to the reaction product of the coating step, adding a solvent including alcohol to the reaction product of the coating step. Accordingly, water included in the product of the coating step may be substituted with the solvent including alcohol, such that at the time of adding the solution including the silane-based compound, the silane-based functional group may be easily bonded to the surface of the product of the coating step.

In the adding of the solvent including alcohol to the product of the coating step, examples of the alcohol are not significantly limited, but preferably, may be the same material as the solvent included in the solution including the silane-based compound.

When the silane-based functional group is bonded to the surface of the product of the coating step as described above, the solvents such as alcohol, water, and the like, may be easily removed from the product of the coating step, and thus, pores formed in the product of the coating step may be stably maintained.

The silane-based compound may include a silane compound substituted with at least one functional group selected from the group consisting of a C1-C10 alkyl group and a C1-C10 alkoxy group.

The silane compound may have a chemical structure of $SiH_4$, wherein at least one of four hydrogen atoms bonded to a silicon atom may be substituted with at least one functional group selected from the group consisting of a C1-C10 alkyl group and a C1-C10 alkoxy group.

The alkyl group is a monovalent functional group derived from alkane, and for example, may include straight-chain, branched or cyclic methyl, ethyl, propyl, isobutyl, sec-butyl, tert-butyl, pentyl, hexyl, and the like. The at least one hydrogen atom included in the alkyl group may be substituted with other substituents. For example, the substituents may include a C1-C10 alkyl group, a C2-C10 alkenyl group, a C2-C10 alkynyl group, a C6-C12 aryl group, a C2-C12 heteroaryl group, a C6-C12 arylalkyl group, halogen atom, a cyano group, an amino group, an amidino group, a nitro group, an amide group, a carbonyl group, a hydroxy group, a sulfonyl group, a carbamate group, a C1-C10 alkoxy group, and the like.

The alkoxy group is a monovalent functional group which may be bonded to an ether group, and the ether group is a divalent functional group consisting of oxygen atoms, and the alkyl group may be bonded to one end of the ether group.

Description of the alkyl group includes the above-described contents. In the drying of the product of the coating step at the first temperature of about 30° C. to 100° C., alcohol and water remaining in the product of the coating step may be removed to form pores in the coating layer.

The first temperature may be of about 30° C. to 100° C., of about 50° C. to 90° C., or particularly of about 70° C. to 90° C., and the thermal treatment of the reaction product at the first temperature may be performed for about 10 minutes to 500 minutes, or particularly for about 40 minutes to 80 minutes.

Further, the manufacturing method for a porous thermal insulation coating layer according to an exemplary embodiment of the present invention may include: after the drying at the first temperature, performing thermal treatment at a second temperature greater than the first temperature and less than 300° C. Accordingly, the porous thermal insulation coating layer may have a strong bonding force through a covalent bond with the coating substrate, such that durability of the porous thermal insulation coating layer may be increased. The second temperature may be of about 300° C. or less, of about 100° C. to 250° C., of about 170° C. to 250° C., or particularly of about 180° C. to 220° C. When the second temperature is excessively increased to be about 300° C. or greater, coating hardness and close adhesion force (bonding force) to a metal may be reduced.

Preferably, the second temperature may be of about 20° C. to 220° C., of about 90° C. to 170° C., or particularly of about 100° C. to 140° C., which may be greater than the first temperature. As described above, the second temperature may be greater than the first temperature, and a difference obtained by subtracting the first temperature from the second temperature may be of about 20° C. to 220° C., of about 90° C. to 170° C., or particularly of about 100° C. to 140° C.

The performing of the thermal treatment at the second temperature may be conducted for about 12 hours to 48 hours, or for about 20 hours to 30 hours. When the performing of the thermal treatment at the second temperature is excessively decreased to be less than about 12 hours, a covalent bond between the porous thermal insulation coating layer and the substrate may not be sufficiently formed. Further, when the performing of the thermal treatment at the second temperature is excessively increased to be greater than about 48 hours, coating hardness and close adhesion force (bonding force) to a metal may be reduced.

Meanwhile, according to another exemplary embodiment of the present invention, there is provided a porous thermal insulation coating layer including: an aerogel including at least one metal selected from the group consisting of aluminum, zirconia, titanium and silicon.

The porous thermal insulation coating layer may have a bonding force to a metal substrate, as being measured on the basis of ISO 20502 standard, of about 5N or greater, or 5N to 15N. In particular, the metal included in the aerogel may be bonded to the metal substrate through a polyfunctional group that may include at least one central element selected from the group consisting of carbon, silicon, nitrogen, oxygen, phosphorus and sulfur.

The porous thermal insulation coating layer according to another exemplary embodiment of the present invention may provide thermal insulation material, thermal insulation structure, or the like, such that the thermal insulation material may be maintained for a long period of time in the internal combustion engine in which repeated high temperature and high pressure of conditions are applied. Further, the thermal insulation material may be used for coating the inner surface of the internal combustion engine or the component of the internal combustion engine.

The porous thermal insulation coating layer according to another exemplary embodiment of the present invention may be manufactured by the manufacturing method for a porous thermal insulation coating layer according to an exemplary embodiment of the present invention.

Description of the manufacturing method for a porous thermal insulation coating layer includes the above-described contents in an exemplary embodiment of the present invention.

The porous thermal insulation coating layer may include an aerogel including at least one metal selected from the group consisting of aluminum, zirconia, titanium and silicon. The aerogel may have a substantially reduced density, and the aerogel may have a structure in which microfilaments having a thickness corresponding to about 1 to one 10,000 th of a hair thickness may be entangled and having a characteristic of high porosity, such that high translucency and ultra-low thermal conductivity may be implemented due to the structural characteristic.

The aerogel may include at least one metal selected from the group consisting of aluminum, zirconia, titanium and silicon.

The aerogel may include pores having a diameter of about 1 nm to 500 nm, of about 5 nm to 300 nm, or particularly of about 10 nm to 100 nm. Accordingly, the aerogel may have a specific surface area of about 100 cm$^3$/g to 1,000 cm$^3$/g, or particularly of about 300 cm$^3$/g to 900 cm$^3$/g. An example of the method for measuring the specific surface area is not limited, but for example, may be a BET specific surface area measurement. In the porous thermal insulation coating layer, a bonding force to the metal substrate measured on the basis of ISO 20502 standard may be 5N or greater, or particularly of about 5N to 20N.

When the bonding force to the metal substrate is less than about 5N, the porous thermal insulation coating layer may not have sufficient durability, such that crack may occur on the coating layer or an excitation phenomenon from the metal substrate may occur.

The metal substrate refers to a substrate including metal as main components, for example, the metal may constitute greater than about 50% by weight, greater than about 60% by weight greater than about 70% by weight greater than about 80% by weight greater than about 90% by weight, or greater than about 95% by weight of the total weight of the substrate. The substrate refers to a material to be coated by the porous thermal insulation coating layer, and examples thereof are not significantly limited, but for example, may include an inner surface or a surface of the internal combustion engine, an inner surface or a surface of the component of the internal combustion engine, and the like. Examples of the metal included in the substrate may include at least one selected from the group consisting of aluminum, zirconia, titanium, and silicon. Preferably, the porous thermal insulation coating layer and the surface of the metal substrate may be bonded through a polyfunctional group as a medium, the polyfunctional group including at least one central element selected from the group consisting of carbon, silicon, nitrogen, oxygen, phosphorus and sulfur. The polyfunctional group may be a functional group including at least two bonding points, for example, when the bonding points are two, a divalent functional group is formed, and when the bonding points are three, a trivalent functional group is formed.

As shown in FIG. 1, one bonding point of the polyfunctional group including at least one central element selected from the group consisting of carbon, silicon, nitrogen, oxygen, phosphorus, and sulfur may form a covalent bond with the metal included in the aerogel (1) of the porous thermal insulation coating layer, and other bonding points may form covalent bonds with the metal included on the surface of the metal substrate (2).

In addition, examples of the polyfunctional group including at least one selected from the group consisting of carbon, silicon, nitrogen, oxygen, phosphorus and sulfur may include a methylene group, a carbonyl group, an ester group, an amide group, an ether group, a sulfide group, a disulfide group, an amino group, an azo group, and the like.

The aerogel may include a silane-based functional group bonded to a surface. Accordingly, the solvent may be easily removed from the aerogel, and the pores included in the aerogel may be stably maintained.

The silane-based functional group may include a silyl functional group substituted with at least one functional group selected from the group consisting of a C1-C10 alkyl group and a C1-C10 alkoxy group.

The silyl group is a monovalent functional group having a chemical structure of $SiH_3-$, wherein at least one of three hydrogen atoms bonded to a silicon atom may be substituted with at least one functional group selected from the group consisting of a C1-C10 alkyl group and a C1-C10 alkoxy group.

The alkyl group is a monovalent functional group derived from alkane, and for example, may include straight-chain, branched or cyclic methyl, ethyl, propyl, isobutyl, sec-butyl, tert-butyl, pentyl, hexyl, and the like. The at least one hydrogen atom included in the alkyl group may be substituted with other substituents. Examples of the substituents may include a C1-C10 alkyl group, a C2-C10 alkenyl group, a C2-C10 alkynyl group, a C6-C12 aryl group, a C2-C12 heteroaryl group, a C6-C12 arylalkyl group, halogen atom, a cyano group, an amino group, an amidino group, a nitro group, an amide group, a carbonyl group, a hydroxy group, a sulfonyl group, a carbamate group, a C1-C10 alkoxy group, and the like.

The alkoxy group is a monovalent functional group in which an alkyl group may be bonded to an ether group, and the ether group is a divalent functional group consisting of oxygen atoms, and the alkyl group may be bonded to one end of the ether group. Description of the alkyl group includes the above-described contents.

A porosity of the porous thermal insulation coating layer may be of about 10% or greater, of about 10% to 50%, or particularly of about 15% to 50%. The porosity of the porous thermal insulation coating layer refers to a ratio of pores contained in the porous thermal insulation coating layer, and for example, may mean a percentage ratio of an area occupied by pores with respect to entire cross-sectional area of one cross-section of the thermal insulation coating layer for measuring the porosity.

When the porosity of the porous thermal insulation coating layer is less than about 10%, the aerogel included in the porous thermal insulation coating layer may be lost by melting an inner pore structure of the aerogel included in the porous thermal insulation coating layer in the coating process, and the like, such that thermal insulation property by the aerogel may not be sufficiently implemented.

Thermal conductivity of the porous thermal insulation coating layer, as being measured according to ASTM E1461, may be of about 1.8 W/mK or less, of about 0.1 W/mK to 1.8 W/mK, or particularly of about 0.1 W/mK to 1.6 W/mK. The thermal conductivity refers to a degree of capacity in which heat is capable of being transferred by conduction. As known in the related art, as the thermal conductivity is decreased, transfer of thermal kinetic energy may be slow, such that thermal insulation property may be substantially improved.

When the thermal conductivity of the porous thermal insulation coating layer is greater than about 1.8 W/mK, transfer of thermal kinetic energy, may be excessively rapid, such that an amount of thermal energy emitted to the outside of the porous thermal insulation coating layer may be increased, whereby thermal insulation property may be decreased, and accordingly, energy efficiency may be reduced.

In addition, volumetric heat capacity of the porous thermal insulation coating layer, as being measured according to ASTM E1269, may be about 2000 KJ/m$^3$K or less, or about 1900 KJ/m$^3$K or less, or about 1850 KJ/m$^3$K or less. The volumetric heat capacity refers to a heat quantity required for increasing one degree of a unit volume of a material, which may be calculated by the following Equation 1.

Volumetric Heat Capacity (KJ/m$^3$K)=Specific heat (KJ/g•K)×Density (g/m$^3$)     [Equation 1]

Therefore, when the volumetric heat capacity of the porous thermal insulation coating layer is excessively increased to be greater than about 2000 KJ/m$^3$K, density of the porous thermal insulation coating layer may be increased, and thermal conductivity may be increased, such that it may be difficult to obtain a target thermal insulation property.

A density of the porous thermal insulation coating layer measured at normal temperature and pressure may be of about 1.5 g/ml to 3.0 g/ml, or particularly of about 1.7 g/ml to 2.7 g/ml. When the density of the porous thermal insulation coating layer is less than about 1.5 g/ml, the pores may be formed excessively in the porous thermal insulation coating layer, such that mechanical strength such as weather resistance, and the like of the porous thermal insulation coating layer may be decreased. Further, when the density of the porous thermal insulation coating layer is greater than 3.0 g/ml, the pores may not be sufficiently formed in the porous thermal insulation coating layer, such that the thermal conductivity and the volumetric heat capacity may not be decreased to appropriate levels, and accordingly, thermal insulation effect may be decreased.

The porous thermal insulation coating layer may have a thickness of about 10 μm to 2,000 μm, of about 20 μm to 500 μm, of about 30 μm to 300 μm, or of about 50 μm to 100 μm. As described above, since the thermal conductivity and the volumetric heat capacity of the porous thermal insulation coating layer correspond to physical properties to unit volume, when the thickness is changed, physical properties may be affected. When the thickness of the porous thermal insulation coating layer is less than about 10 µm, the density of the porous thermal insulation coating layer may not be sufficiently decreased, such that thermal conductivity may not be reduced to a predetermined level or less, and prevention of internal corrosion and surface protection may be deteriorated. On the contrary, when the thickness of the porous thermal insulation coating layer is greater than about 2,000 µm, crack may occur on the porous thermal insulation coating layer.

Meanwhile, according to another exemplary embodiment of the present invention, an internal combustion engine including the porous thermal insulation coating layer according to another exemplary embodiment of the present invention formed on an inner surface of the internal combustion engine or a surface of the internal combustion engine, may be provided.

Description of the porous thermal insulation coating layer may include the above-described contents of another exemplary embodiment of the present invention, and the internal combustion engine is not significantly limited in view of specific structure and kind, and may be various internal combustion engines that are widely known in the existing internal combustion engine field, without limitation.

Further, the internal combustion engine includes all of components of the internal combustion engine, in addition to the internal combustion engine. Preferably, the porous thermal insulation coating layer may be bonded with inner surface of the internal combustion engine, or the surface of the internal combustion engine, through a polyfunctional group including at least one central element selected from the group consisting of carbon, silicon, nitrogen, oxygen, phosphorus and sulfur. The polyfunctional group may be a functional group including at least two bonding points. For example, when the bonding points are two, a divalent functional group may be formed, and when the bonding points are three, a trivalent functional group may be formed.

In addition, one bonding point of the polyfunctional group including at least one central element selected from the group consisting of carbon, silicon, nitrogen, oxygen, phosphorus, and sulfur may form a covalent bond with the metal included in the porous thermal insulation coating layer, and other bonding points may form covalent bonds with the metal included in the inner surface or the surface of the internal combustion engine.

Preferably, examples of the polyfunctional group including at least one selected from the group consisting of carbon, silicon, nitrogen, oxygen, phosphorus and sulfur may include a methylene group, a carbonyl group, an ester group, an amide group, an ether group, a sulfide group, a disulfide group, an amino group, an azo group, and the like.

A bonding force between the porous thermal insulation coating layer and the inner surface of the internal combustion engine, or a bonding force between the porous thermal insulation coating layer and the surface of the internal combustion engine may be 5N or greater, or of about 5N to 20N. When the bonding force between the porous thermal insulation coating layer and the inner surface of the internal combustion engine, or the bonding force between the porous thermal insulation coating layer and the surface of the internal combustion engine is less than about 5N, sufficient durability may not be obtained, such that crack may occur on the coating layer or an excitation phenomenon may occur. The bonding force is measured on the basis of ISO 20502 standard.

According to the present invention, the manufacturing method for a porous thermal insulation coating layer capable of securing low thermal conductivity and low volumetric heat capacity and being applied to an internal combustion engine to have excellent durability, the porous thermal insulation coating layer, and the internal combustion engine using the same, may be provided.

EXAMPLE

Hereinafter, the present disclosure will be explained in detail with reference to the following examples. However, these examples are only to illustrate the inventive concept, and the scope of the inventive concept is not limited thereto.

Examples 1 to 5: Manufacture of Porous Thermal Insulation Coating Layers

Alumina sol was prepared by stirring a thermal insulation coating composition in which aluminum alkoxide (aluminum isopropoxide), ethanol, water and hydrochloric acid were mixed at a weight ratio shown in the following Table 1 below, followed by stirring at a temperature of 50° C. for 30 minutes. The alumina sol was coated on an aluminum alloy (ADC12) substrate, and left at a temperature of 70° C. for about 30 minutes, followed by gelation, thereby preparing an alumina wet gel.

An excessive amount of isopropyl alcohol (IPA) was added to the alumina wet gel so as to substitute solvents in the alumina wet gel with isopropyl alcohol, and a propoxytrimethylsilane/isopropyl alcohol (IPA) solution having a concentration of 0.1 wt % was added at a temperature of 30° C. for 60 minutes.

Then, the alumina wet gel was thermally treated at a temperature of 80° C. for 60 minutes to remove solvents such as ethanol, water, and the like, followed by secondary thermal treatment at a temperature of 200° C. for 24 hours, thereby manufacturing a porous thermal insulation coating layer having a covalent bond with a surface of the substrate.

TABLE 1

Compositions of various exemplary thermal insulation coating compositions of Examples 1 to 5

| Classification | Aluminum alkoxide (wt %) | Ethanol (wt %) | Water (wt %) | Hydrochloric acid (wt %) |
|---|---|---|---|---|
| Example 1 | 20 | 20 | 59 | 1 |
| Example 2 | 30 | 10 | 59 | 1 |
| Example 3 | 40 | 10 | 49 | 1 |
| Example 4 | 20 | 10 | 69 | 1 |
| Example 5 | 30 | 20 | 49 | 1 |

Comparative Example: Manufacture of Porous Thermal Insulation Coating Layer

Comparative Example 1

An alumina wet gel was prepared by leaving the alumina sol of Example 1 at a temperature of 80° C. for 60 minutes to perform gelation. Then, the alumina wet gel was mixed with a binder resin and coated on a substrate, thereby manufacturing a porous thermal insulation coating layer.

Experimental Example: Measurement of Physical Properties of Porous Thermal Insulation Coating Layers Obtained by Examples and Comparative Example Physical properties of the porous thermal insulation coating layers obtained by Examples and Comparative Example were measured as follows, and results thereof were shown in the following Table 2.

1. Thermal Conductivity (W/mK)

With respect to the porous thermal insulation coating layers of Examples and Comparative Example, thermal conductivity was measured by thermal diffusion measurement method using a laser flash method at normal temperature and pressure according to ASTM E1461.

2. Volumetric Heat Capacity (KJ/m$^3$K)

With respect to the porous thermal insulation coating layers of Examples and Comparative Example, heat capacity was confirmed by measuring specific heat using sapphire as a reference by differential scanning calorimetry (DSC) at room temperature according to ASTM E1269.

3. Porosity (%)

Porosity was measured on surfaces obtained by vertically cutting the porous thermal insulation coating layers of Examples and Comparative Example using an Image J program of image analyzer.

4. Density (g/ml)

With respect to the porous thermal insulation coating layers of Examples and Comparative Example, density was measured by an electronic scale and Vernier Calipers at normal temperature and pressure according to apparent density measurement standard.

5. Bonding Force (N)

The bonding force to the metal substrate of each of the porous thermal insulation coating layers of Examples and Comparative Example was evaluated by bonding each porous thermal insulation coating layer to the metal substrate. The measuring power (peel strength) applied at the time point when the bond of each porous thermal insulation coating layer and the metal substrate was broken was measured by scratching a surface of each porous thermal insulation coating layer with power continuously increased in a direction perpendicular to the surfaces though a fine needle, using a device for measuring close adhesion force from CSM Co., on the basis of ISO 20502 standard.

TABLE 2

Experimental results among Examples and Comparative Example

| Classification | Thermal conductivity (W/mK) | Volumetric heat capacity (KJ/m$^3$K) | Porosity (%) | Density (g/ml) | Bonding force (N) | Thickness (μm) |
|---|---|---|---|---|---|---|
| Example 1 | 0.988 | 1214 | 48 | 1.88 | 8.5 | 201 |
| Example 2 | 1.56 | 1425 | 17 | 2.05 | 14.3 | 256 |
| Example 3 | 1.25 | 1845 | 23 | 2.54 | 13.2 | 298 |
| Example 4 | 1.24 | 1121 | 37 | 1.93 | 5.6 | 179 |
| Example 5 | 1.33 | 1054 | 42 | 2.12 | 10.5 | 244 |
| Comparative Example 1 | 0.56 | 937 | 35 | 1.23 | 3.1 | 210 |

As shown in Table 2 above, it was confirmed that the porous thermal insulation coating layers of Examples 1 to 5 had a porosity of 17% to 48%, such that thermal insulation property could be implemented through sufficiently reduced level of thermal conductivity and volumetric heat capacity, and further, high bonding force of 5.6N to 14.3N to the metal substrate was shown.

On the contrary, in Comparative Example 1 in which the gel component containing pores was dispersed in the binder resin, and then, the coating layer was formed on the metal substrate according to the related art, the bonding force to the metal substrate was 3.1N, which was significantly lower than those of Examples.

It was confirmed from the results above that when the porous thermal insulation coating layers of Examples were applied to a surface of an internal combustion engine, and the like, improved durability and thermal insulation property could be implemented on the basis of high bonding force to the metal substrate.

What is claimed is:

1. A porous thermal insulation coating layer consisting of:
   an aerogel comprising at least one metal selected from the group consisting of aluminum, zirconia, titanium and silicon,
   wherein the porous thermal insulation coating layer has a bonding force to a metal substrate, measured on the basis of ISO 20502 standard, is 5N or greater,
   wherein the element included in the aerogel is bonded to the metal substrate through a polyfunctional group that comprises at least one element selected from the group consisting of carbon, silicon, nitrogen, oxygen, phosphorus and sulfur,
   wherein a porosity of the porous thermal insulation coating layer is about 10% or greater,
   wherein the aerogel and the metal substrate is bonded by covalent bond.

2. The porous thermal insulation coating layer of claim 1, wherein the aerogel comprises pores having a diameter of about 1 nm to 500 nm.

3. The porous thermal insulation coating layer of claim 1, wherein the aerogel further comprises a silane-based functional group bonded to a surface.

4. The porous thermal insulation coating layer of claim 3, wherein the silane-based functional group comprises a silyl functional group substituted with at least one functional group selected from the group consisting of a C1-C10 alkyl group and a C1-C10 alkoxy group.

5. The porous thermal insulation coating layer of claim 1, wherein a volumetric heat capacity of the porous thermal insulation coating layer, as measured according to ASTM E1269, is about 2000 KJ/m3K or less.

6. The porous thermal insulation coating layer of claim 1, wherein a thermal conductivity of the porous thermal insulation coating layer, as measured according to ASTM E1461, is about 1.80 W/mK or less.

7. An internal combustion engine comprising a porous thermal insulation coating layer of claim 1 formed on an inner surface or a surface of the internal combustion engine.

8. The internal combustion engine of claim 7, wherein:
   the porous thermal insulation coating layer is bonded with and the inner surface of the internal combustion engine or the surface of the internal combustion engine, through a polyfunctional group that comprises at least one element selected from the group consisting of carbon, silicon, nitrogen, oxygen, phosphorus and sulfur.

9. A vehicle comprising a porous thermal insulation coating layer of claim 1.

* * * * *